Sept. 26, 1939.   T. J. FEGLEY ET AL   2,174,461
ICE BREAKER
Filed July 9, 1938
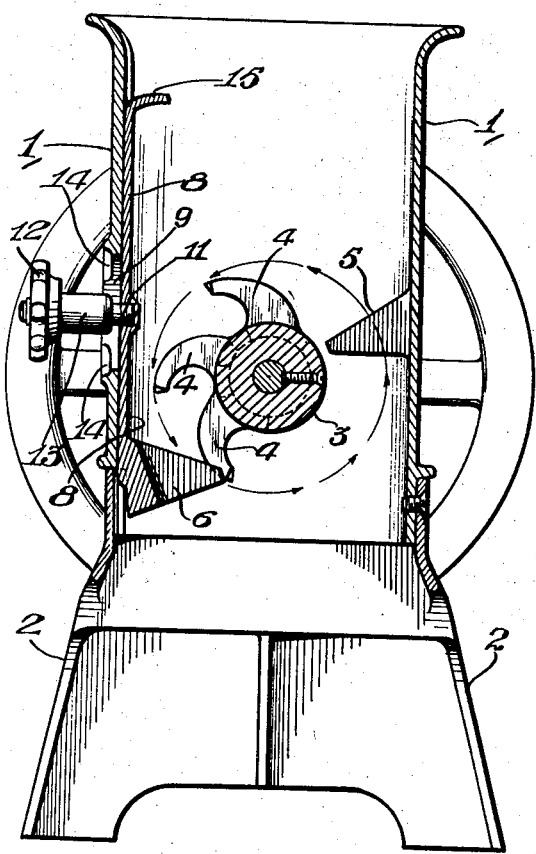
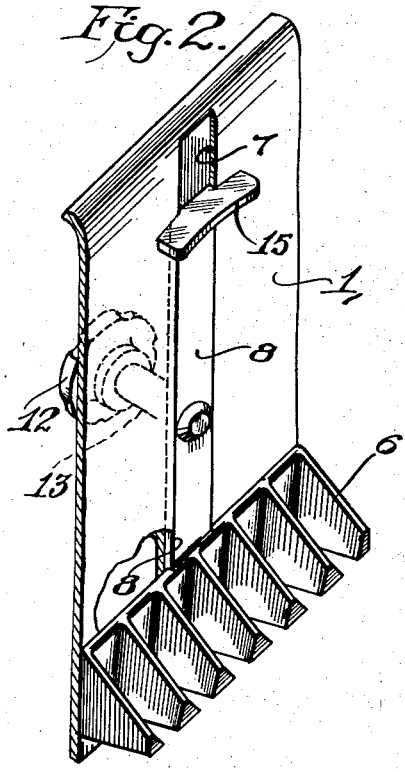
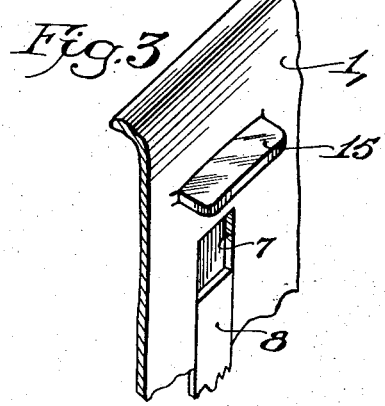
Inventors:—
Thomas J. Fegley
George O. Leopold
by their Attorneys
Howson & Howson Patented Sept. 26, 1939

2,174,461

UNITED STATES PATENT OFFICE 2,174,461

ICE BREAKER

Thomas J. Fegley, Jenkintown, and George O. Leopold, Philadelphia, Pa., assignors to North Bro's M'f'g Co., Philadelphia, Pa., a corporation of Pennsylvania Application July 9, 1938, Serial No. 218,434

4 Claims. (Cl. 83—63)

This invention relates to improvements in ice breakers, and more particularly to improvements in breakers of the type disclosed in our copending application Serial Number 169,298, filed October 15, 1937.

In the aforesaid copending application, we have disclosed an ice breaker having novel and improved means for regulating the sizes of the broken ice particles, this regulating means comprising a toothed comb cooperating with the teeth or tines of a rotary cylinder and slidably adjustable with respect to said cylinder on a wall of the hopper in which the cylinder is mounted.

The principal object of the present invention is to improve both the construction and the functional efficiency of the aforesaid prior device.

In the attached drawing:

Figure 1 is a vertical sectional view of an ice breaker made in accordance with our invention;

Fig. 2 is a fragmentary perspective view of a portion of the breaker shown in Fig. 1, and illustrates the novel structure forming the subject of the present invention; and Fig. 3 is a fragmentary view in perspective illustrating a modification within the scope of the invention.

With reference to Fig. 1, the breaker comprises a hopper 1 which is mounted in an elevated position upon a suitable sub-frame 2, said frame being of a character to permit the insertion of a receptacle underneath the hopper for reception of the broken ice discharged from the latter. Journaled within the hopper 1 and extending between two opposite walls of the latter is a cylinder 3 which carries a plurality of projecting teeth or tines 4, these tines in the present instance being in the form of flat arced blades of the general form shown in Fig. 1. Projecting inwardly from one wall of the hopper, which wall is paralleled by the axis of the cylinder 3, is a suitable deflector 5 which directs the ice fed into the top of the hopper toward the cylinder; and mounted on the opposite wall of the hopper is a comb 6, the projecting teeth of which coact with the tines or blades 4 to break the ice to a desired state of sub-division. The construction insofar as described is more or less conventional and has no immediate relation to the present invention.

As set forth in our above-named copending application, there is in a breaker of this type a more or less fixed functional relation between the rotor and its tines or blades, and the comb 6 and the projecting teeth of the latter. It is desirable that breakers of this class be capable of producing broken ice in a plurality of different grades differing from each other as to particle size, and it is further desirable that in each of the said grades, the size of the broken particles be substantially uniform. We have discovered that this desirable result can be obtained by adjusting the comb to and from the cylinder in a plane extending substantially tangent to an imaginary cylinder coaxial with the cylinder 3. It is desirable also that this adjustment of the comb be a simple and easy one and capable of being effected with a minimum loss of time. Still further, we have found that for maximum efficiency it is desirable that the ice shall have free and unobstructed access to the space between the cylinder 3 and the cooperating comb 6.

In accordance with the present invention, therefore, we form the hopper 1 so that the wall upon which the comb 6 is mounted shall have a longitudinal recess 7 extending in the upright direction. The comb 6 is provided with a strap 8 which extends at the back and upwardly from the top of the comb and which is formed to neatly and slidably fit within the recess 7, as shown for example in Fig. 2. The construction is such that when the strap 8 occupies the recess 7, the rear surface of the comb 6 lies flush against the wall of the hopper and the forward surface of the strap is flush with the surface of the wall.

As shown in Fig. 1, the recess 7 is intersected by a slot 9 through which extends a stud 11, the inner end of the stud being secured to the strap 8. The stud 11 carries at its outer end a hand nut 12 which is adapted under certain circumstances to engage the outer end of a cup-like sleeve 13 carried on the stud. In the inside of the cup sleeve 13 is a coiled spring (not shown) which by engagement with the inner side of the nut 12 exerts at all times a resilient pressure tending to hold the sleeve against the wall of the hopper 1 at the outside of the slot 11. The outside of the slot is provided with a series of recesses 14, three in number in the present instance, which are adapted to receive the inner end of the sleeve 13 and under tension of the spring to thereby support the strap in any selected one of a plurality of positions of adjustment longitudinally of the recess 7. When the nut 12 is turned inwardly on the stud, the nut by engagement with the outer end of the sleeve retains the latter positively in the recess 14 and simultaneously clamps the strap and comb solidly and immovably in adjusted position. When the nut 12 is backed off, the said spring within the sleeve 13 functions to resiliently retain the strap 8 against the back of the recess 7 and thereby retains the comb 6 against the inner surface of the hopper wall. Under these circumstances, however, the comb may be adjusted on the hopper wall by pressure exerted on the outer end of the stud 11 either upwardly toward the cylinder 3 or downwardly away from said cylinder. At all times, the strap 8 with the recess 7 acts to guide the comb in a true rectilinear path, and when the nut 12 is tightened on the stud 11 aids the latter to retain the strap and the comb solidly and securely in the adjusted position.

We have found further that there is material advantage in providing the upper end of the strap 8 with an inturned flange 15 which acts to prevent the ice from sliding upwardly to the top of the wall of the hopper and restricts the ice to the breaking area between the cylinder 3 and the adjoining wall of the hopper upon which the comb 6 is mounted. With this arrangement, an exact relationship is maintained between the comb 6 and the flange 15 which does not vary when the comb is adjusted. With this arrangement, when the comb is adjusted, the flange 15 must necessarily be adjusted correspondingly in the same direction. A substantial functional improvement has been found to result from this arrangement. A further advantage of the described construction resides in the highly efficient support afforded the comb 6 by the strap 8 seating within the recess 7. Due to the fact of the extended bearing afforded the strap by the walls of the recess 7, the comb is more readily and smoothly shifted to the various desired positions of adjustment.

A still further advantage resides in the fact that the construction affords below the flange 15 a smooth and unobstructed wall surface over which the ice may pass freely and without hindrance to breaking area.

While, as set forth, it is preferred to mount the flange 15 with the comb 6 upon the strap 8 in such manner that the two are relatively fixed and simultaneously adjustable, it is possible without departure from the invention to form the flange 15, in effect, as a part of the wall of the hopper, as shown for example in Fig. 3. In this case, the recess 7 is terminated short of the under side of the flange 15, and the strap 8 is made sufficiently shorter than the recess 7 to permit the various selective adjustments of the comb 6.

We claim:

1. In an ice breaker, the combination with a hopper, of a cylinder journaled for rotation in the hopper and extending axially between opposite walls of the latter, said cylinder having projecting tines and being spaced from a third wall of said hopper, said latter wall having an elongated recess in its inner surface extending substantially at right angles to a plane including the axis of said cylinder and from a point well below to a point well above said axis, a strap slidably fitted to said recess, a comb attached to the lower end of said strap at a point below the cylinder axis and having teeth projecting inwardly of the hopper and coactive with the said cylinder and its tines in the ice breaking function, and means for adjustably retaining said strap in the recess.

2. In an ice breaker, the combination with a hopper, of a cylinder journaled for rotation in the hopper and extending axially between two opposite walls of the latter, said cylinder having projecting tines and being spaced from a third wall of the hopper, said latter wall having an elongated upwardly extending recess in its inner surface, a strap slidably fitted to said recess, a comb attached to the lower part of said strap and having teeth projecting inwardly of the hopper, a flange secured to the upper part of said strap and projecting into the hopper above the cylinder, means for adjustably retaining said strap in the recess, and means for rotating the cylinder so that the said tines advance over the top of said cylinder toward both the comb and said flange for coaction therewith in the ice-breaking function.

3. In an ice breaker, the combination with a hopper, of a cylinder journaled for rotation in the hopper and extending axially between two opposite walls of the latter, said cylinder having projecting tines and being spaced from a third wall of the hopper, said latter wall having an elongated upwardly extending recess in its inner surface, a strap slidably fitted to said recess, a comb attached to said strap and having teeth projecting inwardly of the hopper and coactive with the said cylinder and its tines in the ice breaking function, the exposed surface of said strap being flush with the inner surface of the said recessed wall to afford a substantially smooth surface over which the ice may pass downwardly unobstructedly to the comb, and means for adjustably retaining said strap in the recess.

4. In an ice breaker, the combination with a hopper, of a cylinder journaled for rotation in the hopper and extending axially between two opposite walls of the latter, said cylinder having projecting tines and being spaced from a third wall of the hopper, said latter wall having an elongated upwardly extending recess in its inner surface and having a slotted opening in the bottom of said recess, a strap slidably fitted to said recess, a comb attached to said strap and having teeth projecting inwardly of the hopper and coactive with said cylinder and its tines in the breaking function, a stud secured to said strap and projecting through said slot to the exterior of the hopper and affording a means for longitudinally adjusting the strap in the recess, a nut on said stud for clamping the strap solidly to the wall in adjusted position, and resilient means on said stud interposed between the nut and the outer surface of said wall operative under tension and when the nut is loosened on the stud to maintain the strap in position in the bottom of said recess.

THOMAS J. FEGLEY.
GEORGE O. LEOPOLD.